(12) United States Patent
Hsiao

(10) Patent No.: US 8,598,453 B2
(45) Date of Patent: Dec. 3, 2013

(54) POWER STRIP HANGING DEVICE AND STRUCTURE

(75) Inventor: Feng-Hsiu Hsiao, New Taipei (TW)

(73) Assignee: Rite-Tech Industrial Co., Ltd., Taipei (TW)

( * ) Notice: Subject to any disclaimer, the term of this patent is extended or adjusted under 35 U.S.C. 154(b) by 196 days.

(21) Appl. No.: 13/239,616

(22) Filed: Sep. 22, 2011

(65) Prior Publication Data

US 2013/0075557 A1    Mar. 28, 2013

(51) Int. Cl.
*H01H 9/02* (2006.01)

(52) U.S. Cl.
USPC ............. 174/53; 174/481; 174/483; 174/494; 220/3.2; 220/3.3

(58) Field of Classification Search
USPC ......... 174/480, 481, 482, 483, 486, 487, 490, 174/494, 496, 503, 53, 652; 220/3.2–3.9, 220/4.02; 248/223.41, 224.8, 224.7; 439/131, 535; D13/139.4
See application file for complete search history.

(56) References Cited

U.S. PATENT DOCUMENTS

| | | | | |
|---|---|---|---|---|
| 5,231,562 A * | 7/1993 | Pierce et al. | .................. | 439/131 |
| 5,814,764 A * | 9/1998 | Kohaut | ........................ | 174/652 |
| D406,102 S * | 2/1999 | Byrne | ....................... | D13/139.4 |
| 6,024,599 A * | 2/2000 | Stathis et al. | ................. | 174/480 |
| 6,234,812 B1 * | 5/2001 | Ivers et al. | ..................... | 439/131 |
| 6,416,336 B1 * | 7/2002 | Schulte et al. | ................ | 439/131 |
| 7,163,409 B1 * | 1/2007 | Chen et al. | .................... | 439/131 |
| 7,183,501 B2 * | 2/2007 | Bowman | ....................... | 174/480 |
| 7,605,330 B1 * | 10/2009 | Black et al. | .................... | 439/131 |

* cited by examiner

*Primary Examiner* — Angel R Estrada
(74) *Attorney, Agent, or Firm* — Bacon & Thomas, PLLC

(57) ABSTRACT

A power strip hanging device and structure are provided. The hanging device includes a hanger element and a positioning seat. The hanger element has a pulling portion for being pulled by a user and a shoulder extended outward from the periphery of one end thereof. The positioning seat has an upper opening on one side and a lower opening on the opposite side communicating with the upper opening to form a receiving space therein, and is positioned firmly in an installation hole of a table, so that the hanging element can pass through the upper opening and be received in the receiving space with the shoulder resting on the rim of the upper opening. Thus, the hanging element is supported by the positioning seat, and the power strip can pass through the positioning seat and be secured under the table without occupying the space on a top of the table.

11 Claims, 10 Drawing Sheets

POWER STRIP HANGING DEVICE AND STRUCTURE

FIELD OF THE INVENTION

The present invention relates to a power strip hanging device and structure, more particularly to a hanging element having an insertion plug inserted into sockets of a power strip and having a shoulder extended outward from the periphery of one end thereof, so that the shoulder of the hanging element is able to rest on the rim of an installation hole of a table, and allow the power strip to pass through the installation hole and be hung and positioned under the table without occupying or messing up the space on a top of the table.

BACKGROUND OF THE INVENTION

Electronic apparatuses such as computers, projectors, and printers have become indispensable tools for work due to their declining prices and continuously improved performances (e.g., higher computing speed, higher image clarity, etc.). One may even have to use several computers and other electronic apparatuses simultaneously in the workplace. While some electronic apparatuses (e.g., laptop computers) are equipped with batteries for keeping the apparatuses in the working state for a certain period of time, most users tend to plug in such electronic apparatuses so as to extend their operation for as long as desired.

However, floor or wall sockets are always limited in number. Take a conference room for example. When several people gather in a conference room for a meeting, the number of electronic apparatuses to be used often exceeds the fixed number of sockets on the floor or walls of the conference room. Moreover, the power cords of the electronic apparatuses may be too short to be directly connected to the floor or wall sockets. A common solution to the aforesaid problems is to connect a power strip to one of the floor or wall sockets. As a commercially available power strip typically has three to eight sockets, the plugs of the plural electronic apparatuses can be connected to the sockets of the power strip, so as to power the electronic apparatuses via the power strip. According to the observation of the inventor of the present invention, some users would place the power strip on the floor, e.g., under the conference table. In that case, when it is desired to plug the electronic apparatuses into the power strip, the users must go under the table to make the connections, which is very inconvenient. Since the area under the conference table is usually insufficiently lit, it may take a long time to connect the plugs to the power strip, which not only wastes the users' precious time but also causes unnecessary troubles. Furthermore, the users may inadvertently kick the power strip or the plugs under the table such that the plugs come off the power strip. Should this happen, in addition to the inconveniences caused, the electronic apparatuses could be damaged by the sudden power outage, which is highly undesirable.

To prevent the undesirable scenarios described above, most of the conference tables on the market have premade cable holes through which the power cord and plug of a power strip can pass so as to extend under the table and connect to a floor or wall socket, thereby allowing the power strip to be placed on the conference table instead of on the floor. As a result, neither the power strip nor the plugs connected thereto will be kicked by accident, and the plugs of computers, projectors, and other electronic apparatuses on the table can be directly connected to the power strip over the table. Nevertheless, when the power strip is no longer in use, it still occupies certain space on the tabletop, if not making the table untidy.

Hence, the issue to be addressed by the present invention is to overcome the various drawbacks of the existing power strips and design a power strip hanging device and structure whereby a power strip, when not in use, can be rapidly and easily put away under a table without occupying the space on the tabletop, and when desired for use, can be readily taken out from under the table, thus significantly increasing of the convenience of use of the power strip.

BRIEF SUMMARY OF THE INVENTION

In view of the aforementioned drawbacks of the conventional power strips, the inventor of the present invention conducted extensive research and experiment and finally succeeded in developing a power strip hanging device and structure as disclosed herein. The disclosed power strip hanging device and structure are intended to prevent a power strip from being inadvertently kicked as is often the case when it is placed on the floor. The disclosed hanging device and structure are also intended to allow rapid storage of the power strip after use, so that the power strip will not occupy or mess up the space on the tabletop.

It is an object of the present invention to provide a power strip hanging device including a hanging element. The hanging element includes a hanger body and a cover. The cover is provided with an insertion plug corresponding in configuration to the sockets of a power strip so as to be inserted into the sockets. The hanger body has an end defining an end surface, wherein the end surface is provided with a pulling portion to be pulled by the user. In addition, a shoulder extends outward from the periphery of the aforesaid end of the hanger body. The hanger body and the cover can be connected as a single piece, thereby fixing the hanging element securely at one end of the power strip. The hanging element and the power strip can pass through an installation hole of a table at the same time so that the shoulder of the hanging element rests on the rim of the installation hole. Thus, the power strip having passed through the installation hole is secured under the table. The structural features of the present invention are such that the user only has to connect the hanging element to one end of the power strip, and the power strip can be hung and positioned under the table without occupying or messing up the space on the tabletop. When it is desired to use the power strip, the user can pull the pulling portion to not only draw the hanging element out of the installation hole, but also pull the power strip out on the tabletop, thus allowing a plurality of electronic apparatuses to plug into the power strip. Hence, the present invention substantially increases the convenience of use of the power strip.

It is another object of the present invention to provide the foregoing power strip hanging device, wherein the power strip hanging device further includes a positioning seat. The positioning seat has an upper opening on one side and a lower opening on the opposite side. The upper opening and the lower opening communicate with each other and form a receiving space in the positioning seat. Also, the positioning seat is externally provided with a positioning portion that extends outward. The outer configuration of the positioning seat matches the aforesaid installation hole so that the positioning seat can be fixed to the hole wall of the installation hole and be positioned firmly in the installation hole, with the positioning portion resting on the table. In addition, the outer configuration of the hanging element matches the upper opening so that the hanging element can pass through the upper opening and be received in the receiving space of the positioning seat, with the shoulder resting on the rim of the upper opening of the positioning seat. Thus, the hanging element is supported by the positioning seat, and the power strip connected with the hanging element and having passed through the positioning seat is secured under the table.

Yet another object of the present invention is to provide the foregoing power strip hanging device, wherein the hanging element is provided with a first engaging hook, and the positioning seat is provided therein with a second engaging hook corresponding in position to the first engaging hook. Once the hanging element is positioned in the positioning seat, the first engaging hook is engaged with the second engaging hook.

Still another object of the present invention is to provide a power strip hanging structure including a power strip. The power strip has an end defining an end surface, wherein the end surface is provided with a pulling portion. The aforesaid end of the power strip is also peripherally provided with an outwardly extending shoulder. The power strip can pass through an installation hole of a table such that the shoulder rests on the rim of the installation hole. Thus, the power strip having passed through the installation hole is secured under the table and will not occupy any space on the tabletop when not in use.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

The inventor of the present invention has long been engaged in the research and development of power strips and has hence found that the conventional power strips tend to occupy too much space on a tabletop when not in use and may render the tabletop untidy. The industry has tried to overcome the aforesaid problems by improving the conventional power strips, but an ideal solution has yet to be found. In consideration of the above, the inventor came up with the idea of putting a power strip away by hanging and securing it in an installation hole of a table, thereby solving the problem of the conventional power strips that they tend to take up too much space when not in use.

Figure 1:
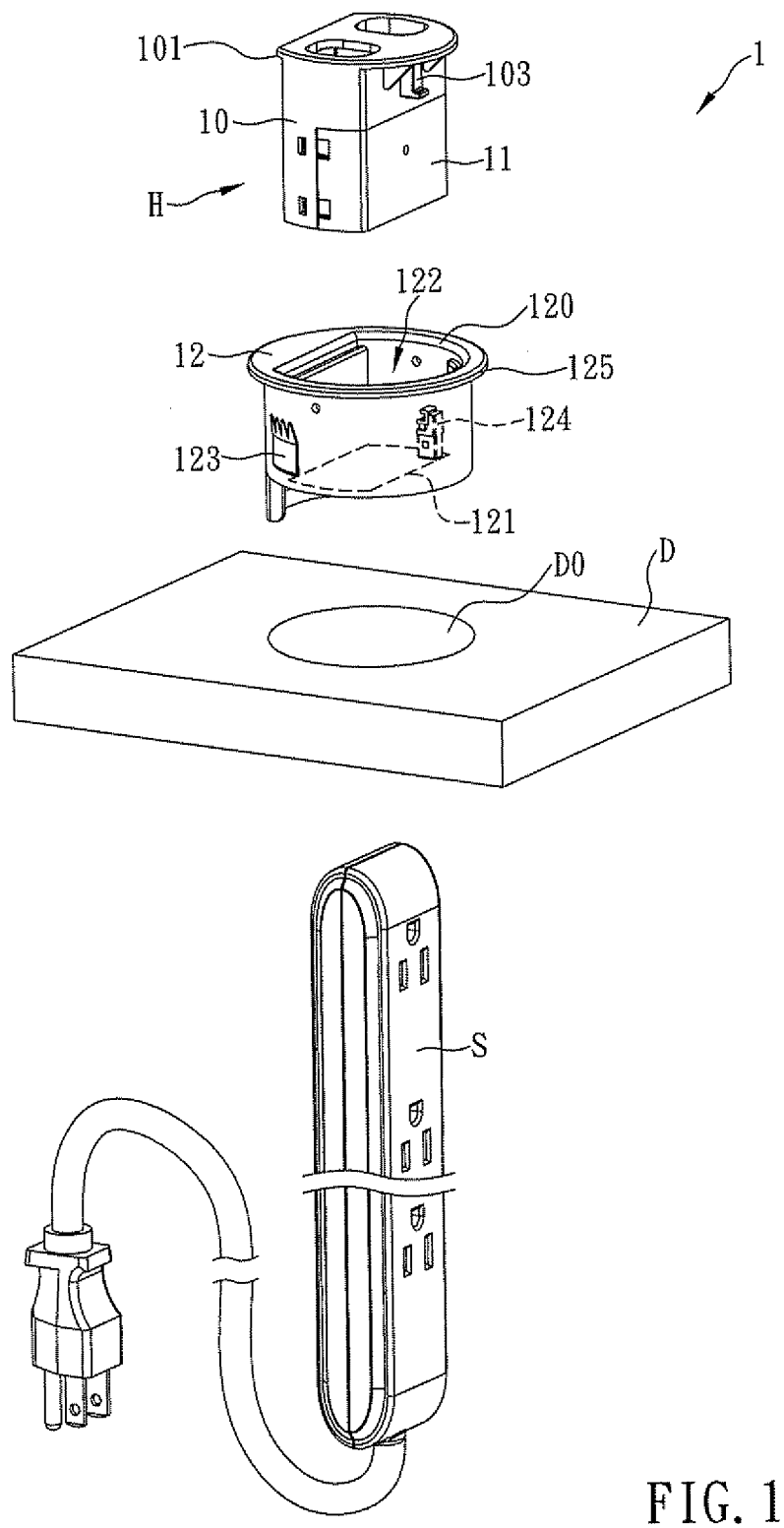
FIG. 1 is an exploded perspective view of the first preferred embodiment of the present invention.
Figure 2:
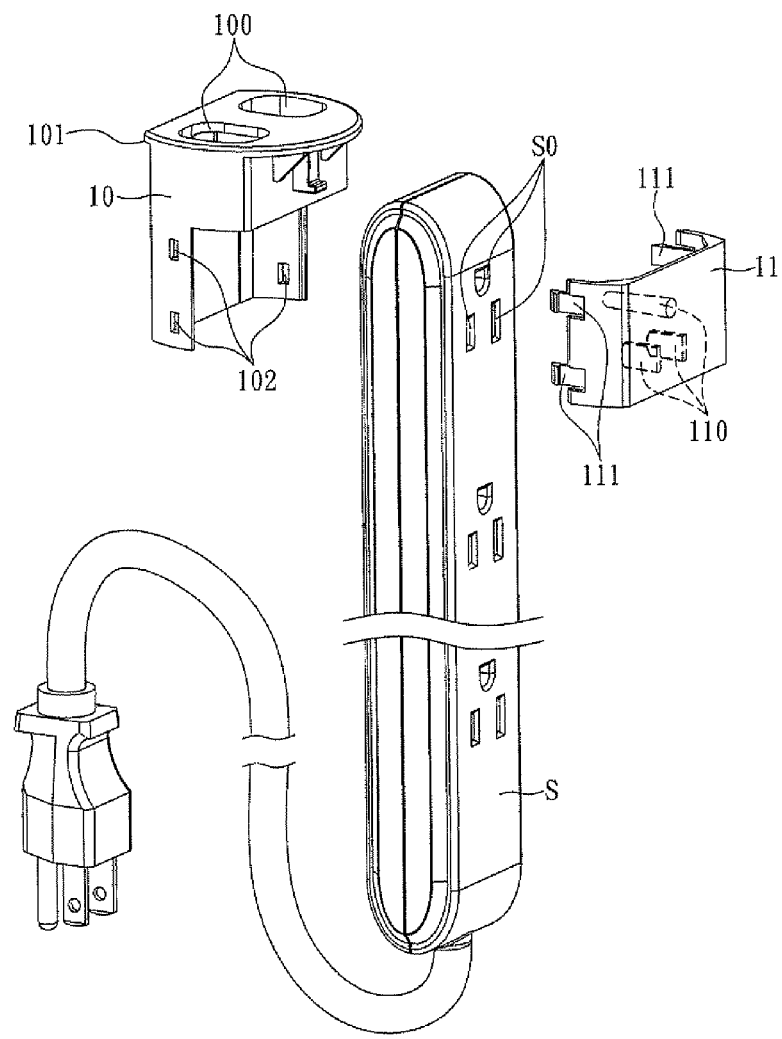
FIG. 2 is another exploded perspective view of the first preferred embodiment of the present invention.

The present invention provides a power strip hanging device and structure. Referring to FIG. 1, a power strip hanging device 1 according to the first preferred embodiment of the present invention includes a hanging element H and a positioning seat 12. The hanging element H includes a hanger body 10 and a cover 11. As shown in FIG. 2, the cover 11 has an insertion plug 110 which corresponds in configuration to and is therefore insertable into the sockets S0 of a power strip S. The hanger body 10 has an end surface formed with a pulling portion 100. In this preferred embodiment, the pulling portion 100 is realized by two pulling grooves concavely provided on an end surface of the hanger body 10. A user can insert his or her fingers into the pulling grooves (i.e., the pulling portion 100) in order to pull the hanger body 10. Nevertheless, the hanger body 10 is not limited to the foregoing design. More specifically, when designing the hanger body 10, the number of the pulling grooves can be increased or decreased, and the depth and diameter of the pulling grooves can also be adjusted as appropriate.

Figure 3:
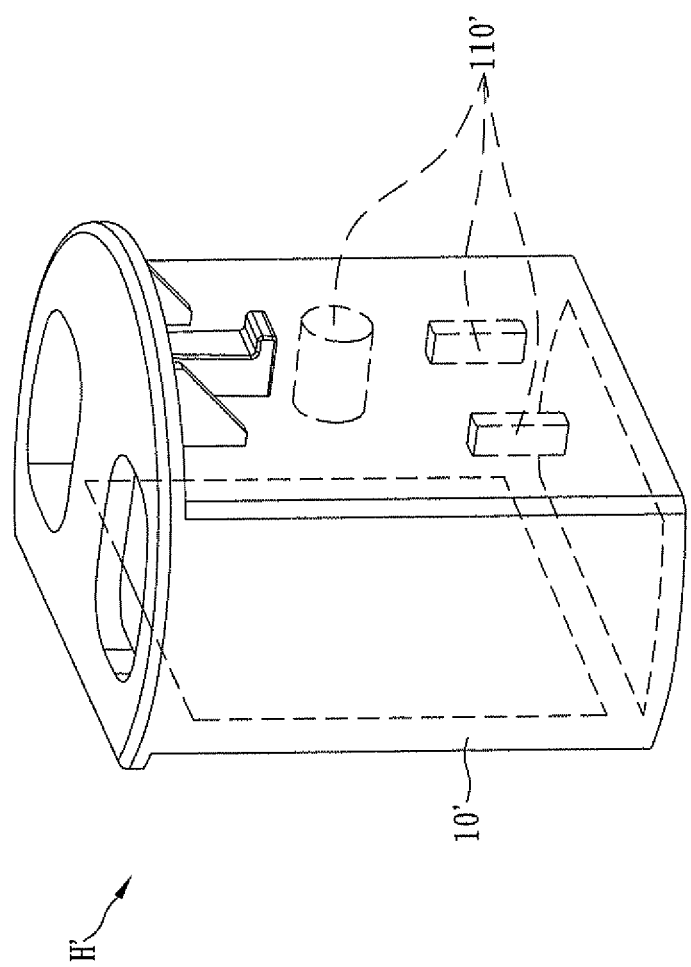
FIG. 3 is a perspective view of another embodiment of the hanging element depicted in FIGS. 1 and 2.

As shown in FIG. 2, the hanger body 10 has one end peripherally provided with an outwardly extending shoulder 101. Besides, the left and right sides of the cover 11 are each extended with two hooks 111, and the hanger body 10 is formed with hook holes 102 corresponding in position to the hooks 111. The hooks 111 can be engaged respectively with the hook holes 102 to connect the hanger body 10 and the cover 11 together, thereby forming the hanging element H of FIG. 1. The insertion plug 110 is inserted in the sockets S0 when the hanger body 10 and the cover 11 are combined. Thus, the hanging element H is fixed securely at one end (i.e., the top end in FIG. 2) of the power strip S. It should be noted that while the hanging element H in this preferred embodiment is composed of the hanger body 10 and the cover 11 as shown in FIG. 1, the present invention is by no means limited to such an arrangement. When making the hanging element according to the concept of the present invention, the structural design of the hanging element may be modified as needed. For instance, FIG. 3 shows a hanging element H' as another embodiment of the hanging element H. As shown in FIG. 3, the cover 11 has been omitted, and the insertion plug 110' is provided inside the hanger body 10'. Alternatively, the hanging element can be designed in such a way that it is directly mountable at one end of the power strip S. All variations which are easily conceivable by a person skilled in the art should fall within the scope of the present invention.

Referring to FIG. 1, the positioning seat 12 in the first preferred embodiment has an upper opening 120 on one side (i.e., the top side in FIG. 1) and a lower opening 121 on the opposite side (i.e., the bottom side). The upper opening 120 and the lower opening 121 communicate with each other to form a receiving space 122 in the positioning seat 12. The outer configuration of the positioning seat 12 matches an installation hole D0 of a table D. In addition, the positioning seat 12 is externally provided with a positioning portion 125 that extends outward and can rest on the table D so as for the positioning seat 12 to be securely positioned in the installation hole D0. Moreover, the positioning seat 12 is externally provided with at least one fixing hook 123 for pressing tightly against the hole wall of the installation hole D0. The fixing hook 123 can fix the positioning seat 12 to the hole wall of the installation hole D0 and prevent the positioning seat 12 from being pulled out of the installation hole D0. On the other hand, the outer configuration of the hanging element H matches the upper opening 120. This allows the hanging element H to pass through the upper opening 120 and be received in the receiving space 122 of the positioning seat 12. Once the hanging element H enters the positioning seat 12, the shoulder 101, which is slightly larger than the upper opening 120 of the positioning seat 12, rests on the rim of the upper opening 120 such that the hanging element H is supported by the positioning seat 12. As such, the power strip S to which the hanging element H is connected and which has passed through the positioning seat 12 is fixed under the table D.

Figure 4:
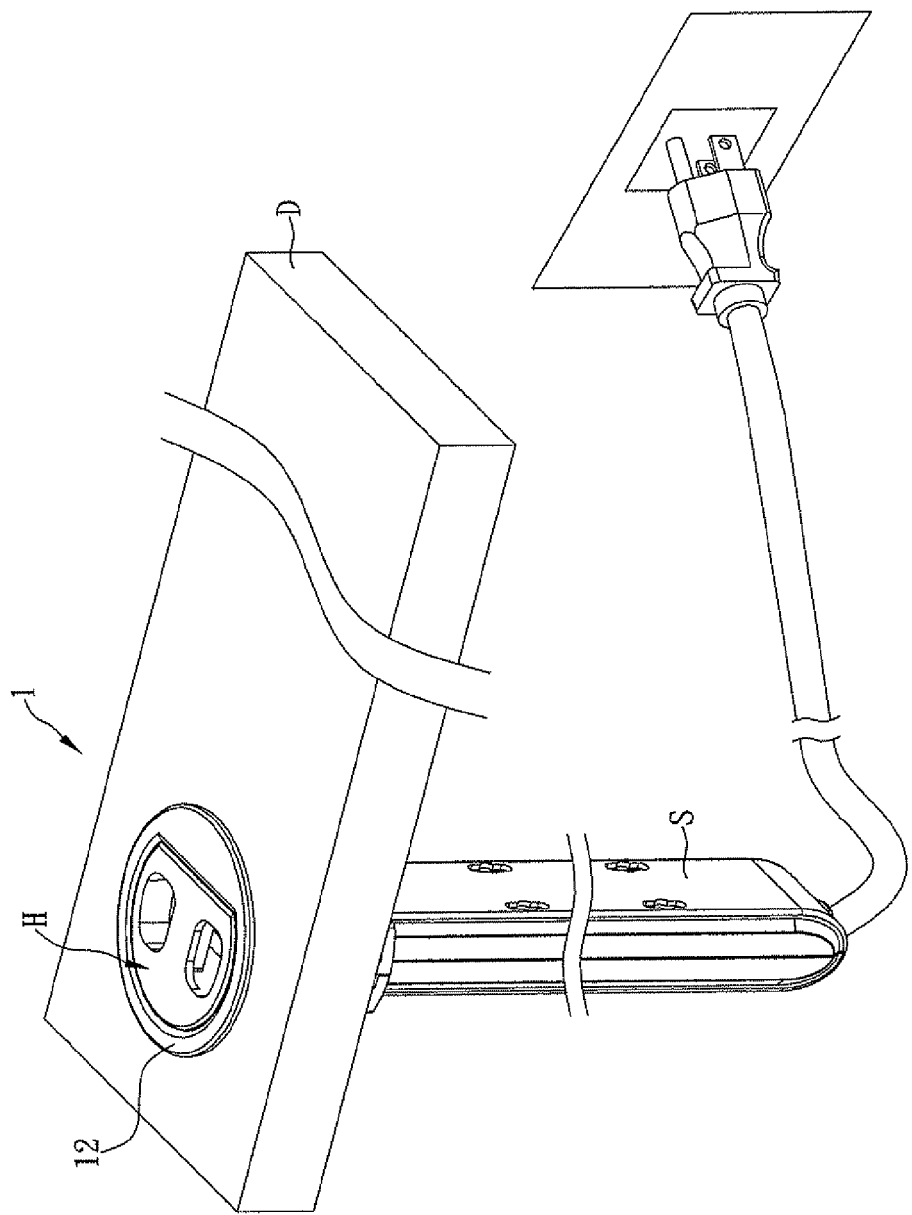
FIG. 4 is a perspective view showing the first preferred embodiment of the present invention in use.
Figure 5:
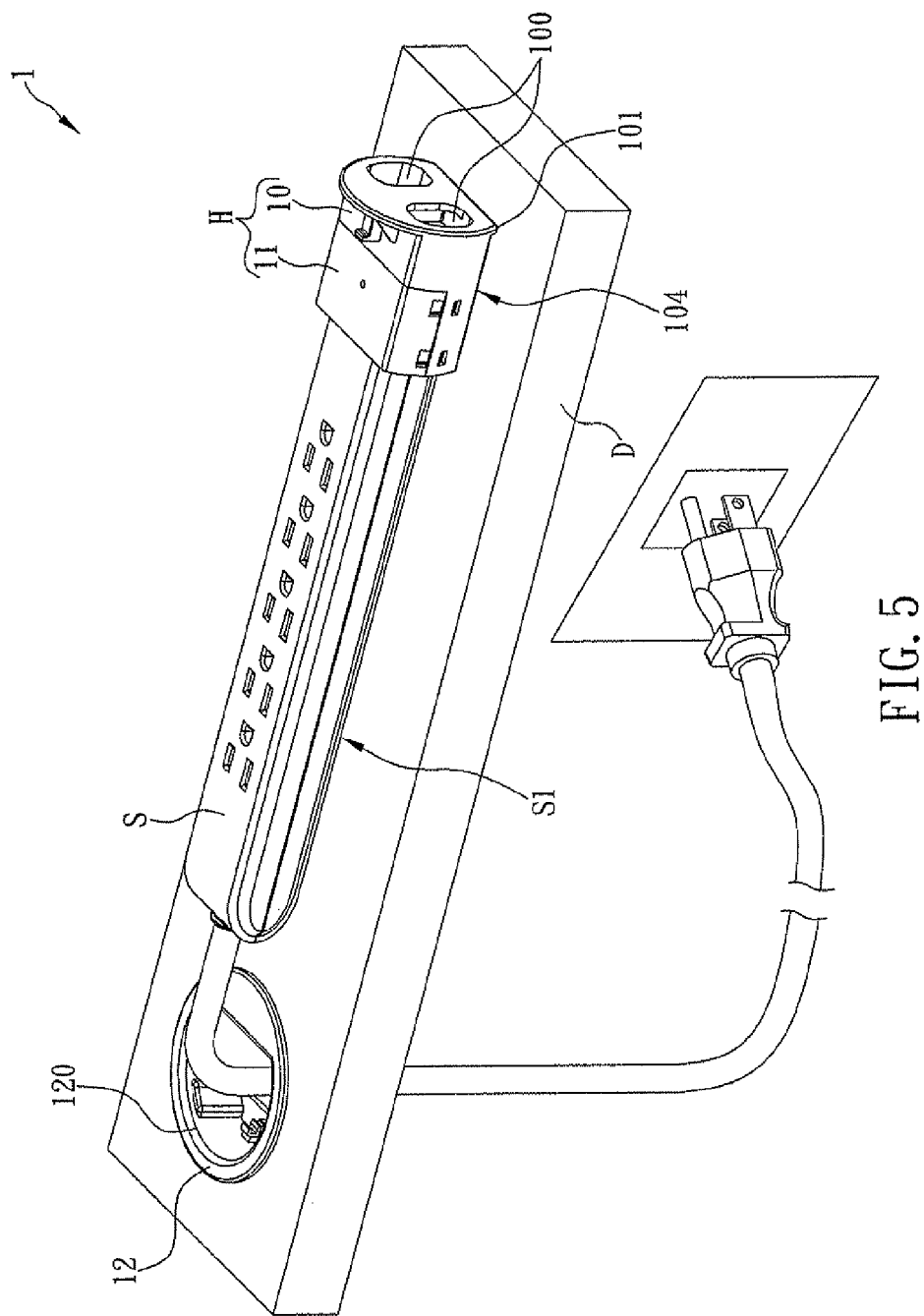
FIG. 5 is a perspective view showing the first preferred embodiment of the present invention in another state of use.

Referring to FIGS. 1 and 2, the foregoing structural features of the first preferred embodiment allow a user to install the positioning seat 12 in the installation hole D0 of the table D, insert the insertion plug 110 of the cover 11 into one socket of the power strip S, connect the hanger body 10 to the cover 11, and then pass both the power strip S and the hanging element H through the positioning seat 12. Consequently, the hanging element H is positioned in the positioning seat 12, and the power strip S is hung under the table D (see FIG. 4). As the power strip S is effectively prevented from taking up space on the table D when not in use, the tidiness of the table D can be maintained. When it is desired to connect the plug (not shown) of an electronic apparatus to the power strip S, the user is no longer required to go under the table D to make such a connection. Instead, referring to FIG. 5, the user only has to pull the pulling portion 100 and thereby draw the hanging element H out of the positioning seat 12. At the same time, the power strip S is pulled out and laid on the table D, so as for the plug of the electronic apparatus to be connected to the power strip S on the table D. This not only increases the convenience of use of the power strip S significantly, but also prevents the plug of the electronic apparatus from coming off the power strip S—an accident very likely to occur if the power strip S and the plug of the electronic apparatus are placed under the table D and are inadvertently kicked. In addition, the hanging element H can be so designed that one lateral side thereof forms a flat surface 104. The flat surface 104 of the hanging element H and one lateral side S1 of the power strip S can jointly form an even larger flat surface that allows the assembly of the power strip S and the hanging element H to lie stably on the table D.

While the power strip hanging device 1 in the first preferred embodiment includes the positioning seat 12, the present invention can also dispense with the positioning seat 12. In that case, the power strip hanging device 1 only includes the hanging element H, which is firmly secured at one end of the power strip S. Once the shoulder 101 of the hanging element H rests on the rim of the installation hole D0, the power strip S having passed through the installation hole D0 is secured under the table D. By doing so, the intended effects of the first preferred embodiment are also achieved.

Figure 6:
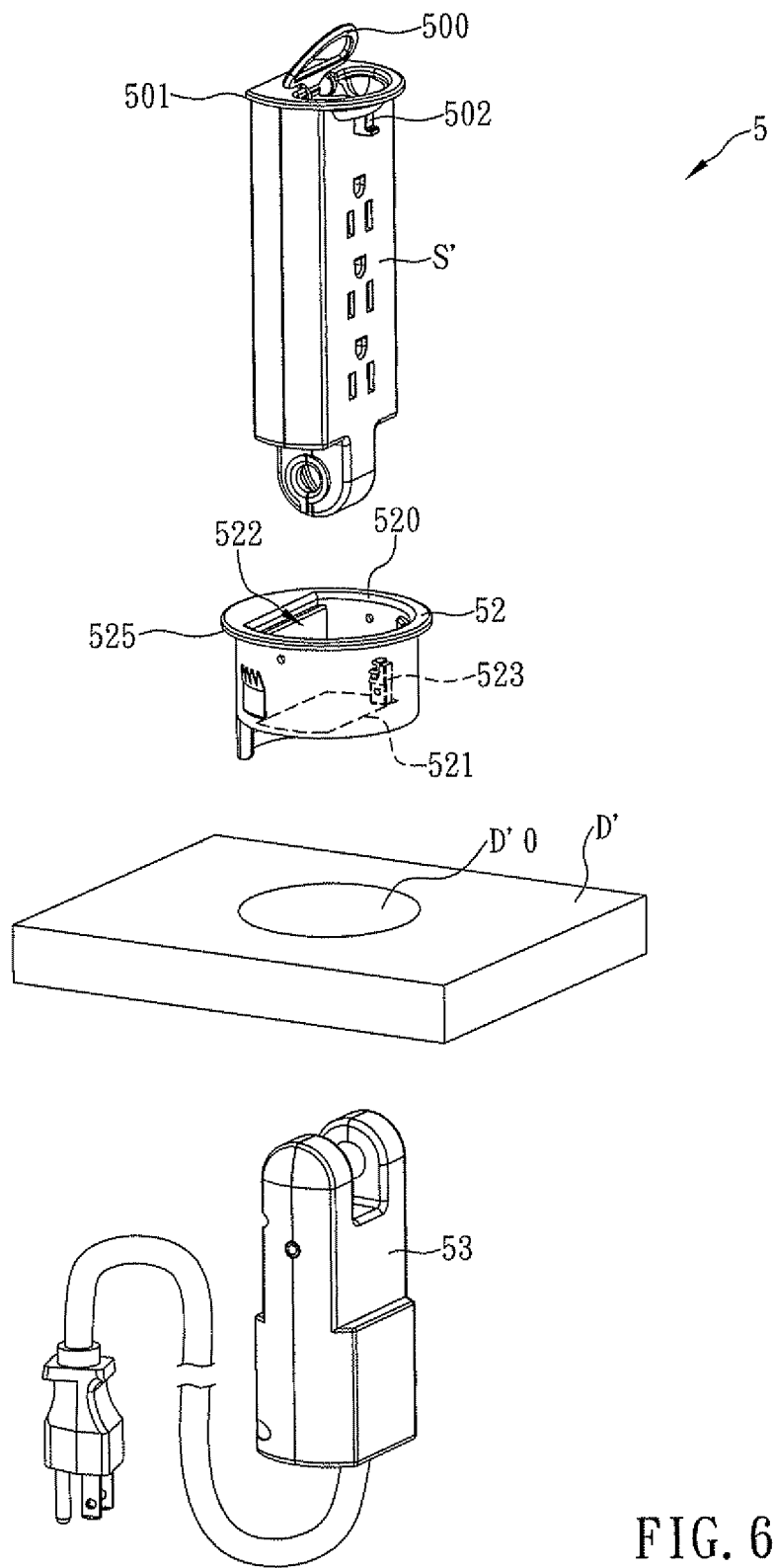
FIG. 6 is an exploded perspective view of the second preferred embodiment of the present invention.

Aside from the technical contents of the first preferred embodiment, the inventor also thought of other ways to implement the concept of the present invention. In the second preferred embodiment of the present invention as shown in FIG. 6, a power strip hanging structure 5 includes a power strip S' and a positioning seat 52, wherein the power strip S' has an end surface (i.e., the top surface in FIG. 6) provided with a pulling portion 500. In the second preferred embodiment, the pulling portion 500 is a pulling ring pivotally connected to a first end of the power strip S' so as to be pulled by the user. However, the present invention is not limited to such a design; the pulling portion 500 can also be configured as the pulling grooves (i.e., the pulling portion 100) depicted in FIG. 2. By the same token, the technical features of the pulling ring (i.e., the pulling portion 500) are equally applicable to the first preferred embodiment. In addition, a shoulder 501 extends peripherally outward from the first end (i.e., the top end in FIG. 6) of the power strip S'.

Figure 7:
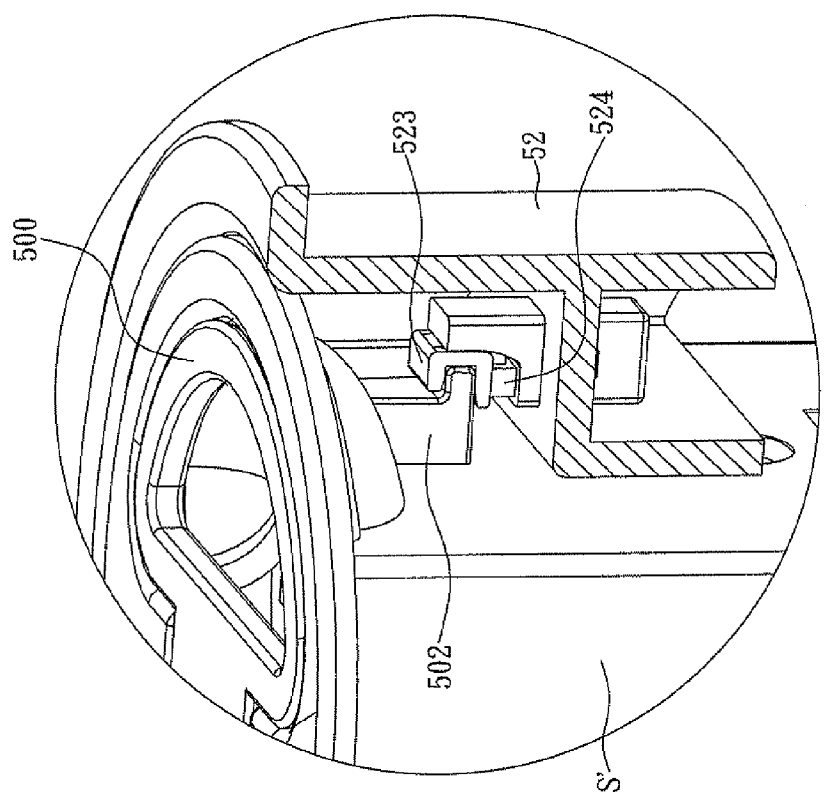
FIG. 7 is a partial, sectional perspective view of the second preferred embodiment of the present invention.

As shown in FIG. 6, the positioning seat 52 has an upper opening 520 on one side and a lower opening 521 on the other side. The upper opening 520 and the lower opening 521 are in communication with each other and jointly form a receiving space 522 in the positioning seat 52. The positioning seat 52 is externally provided with a positioning portion 525 that extends outward. With the outer configuration of the positioning seat 52 matching an installation hole D'0 of a table D', and the positioning portion 525 configured for resting on the table D', the positioning seat 52 can be secured in the installation hole D'0. As shown more clearly in FIG. 7, the power strip S' is laterally provided with a first engaging hook 502, and the positioning seat 52 is provided therein with a second engaging hook 523 corresponding in position to the first engaging hook 502. In the second preferred embodiment, the first engaging hook 502 and the second engaging hook 523 make up a press-activated engaging hook assembly, wherein the second engaging hook 523 is connected to a resilient disengaging structure 524. When the first engaging hook 502 is engaged with the second engaging hook 523, the resilient disengaging structure 524 is moved downward and retained in place, waiting to spring up. When the first engaging hook 502 is subsequently pushed downward, the resilient disengaging structure 524 is triggered to eject the second engaging hook 523 and hence the first engaging hook 502 upward, thereby separating the first engaging hook 502 from the second engaging hook 523. The first engaging hook 502, the second engaging hook 523, and the resilient disengaging structure 524 are similar to those in commercially available press-actuated hook engaging devices, so their structures are not described in detail herein. It should be pointed out that such technical features as the first engaging hook 502 and the second engaging hook 523 can also be applied to the first preferred embodiment. For example, referring to FIG. 1, the hanger body 10 is provided with a first engaging hook 103, and the positioning seat 12 is provided therein with a second engaging hook 124.

Figure 8:
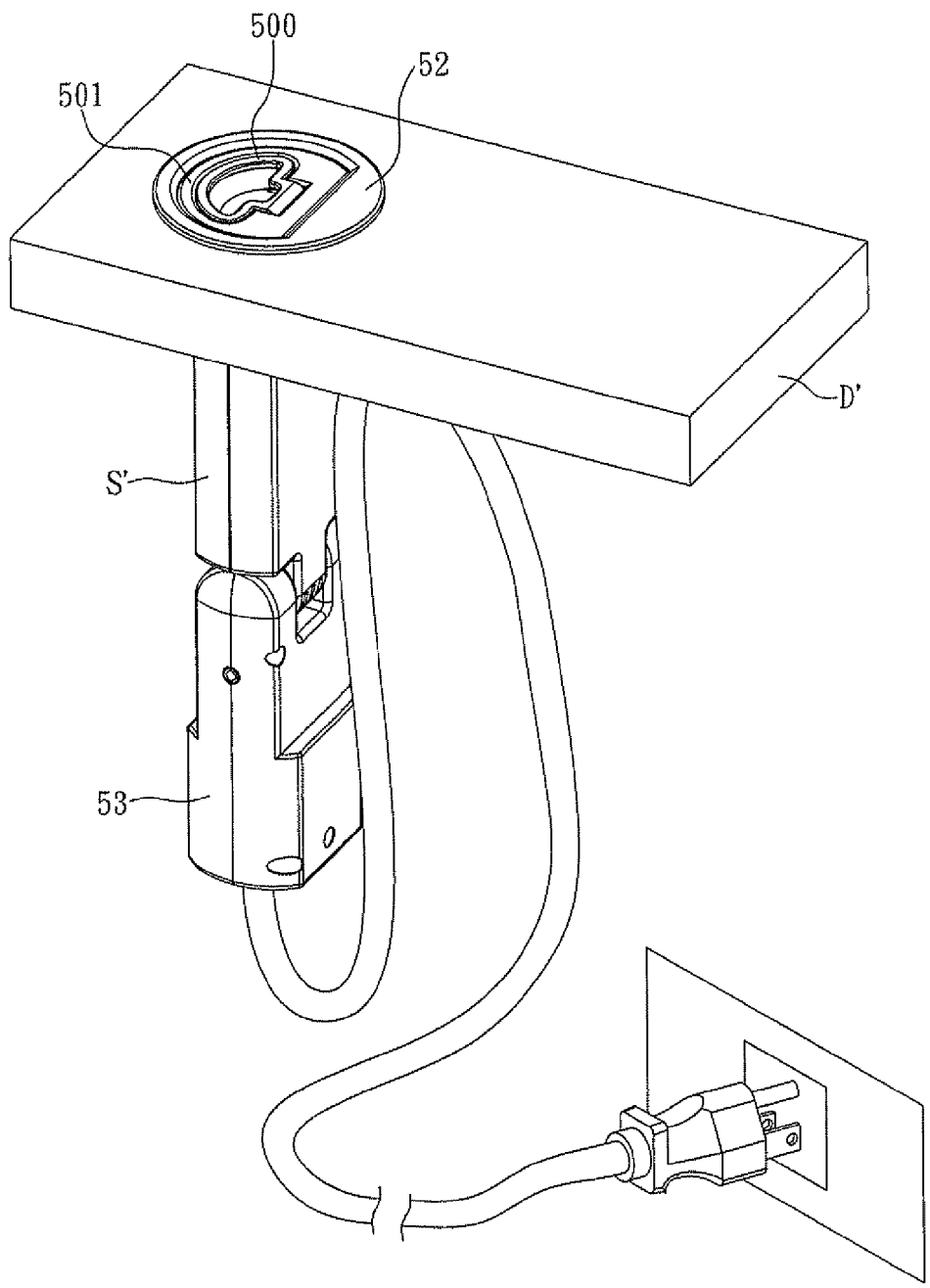
FIG. 8 is a perspective view showing the second preferred embodiment of the present invention in use.
Figure 9:
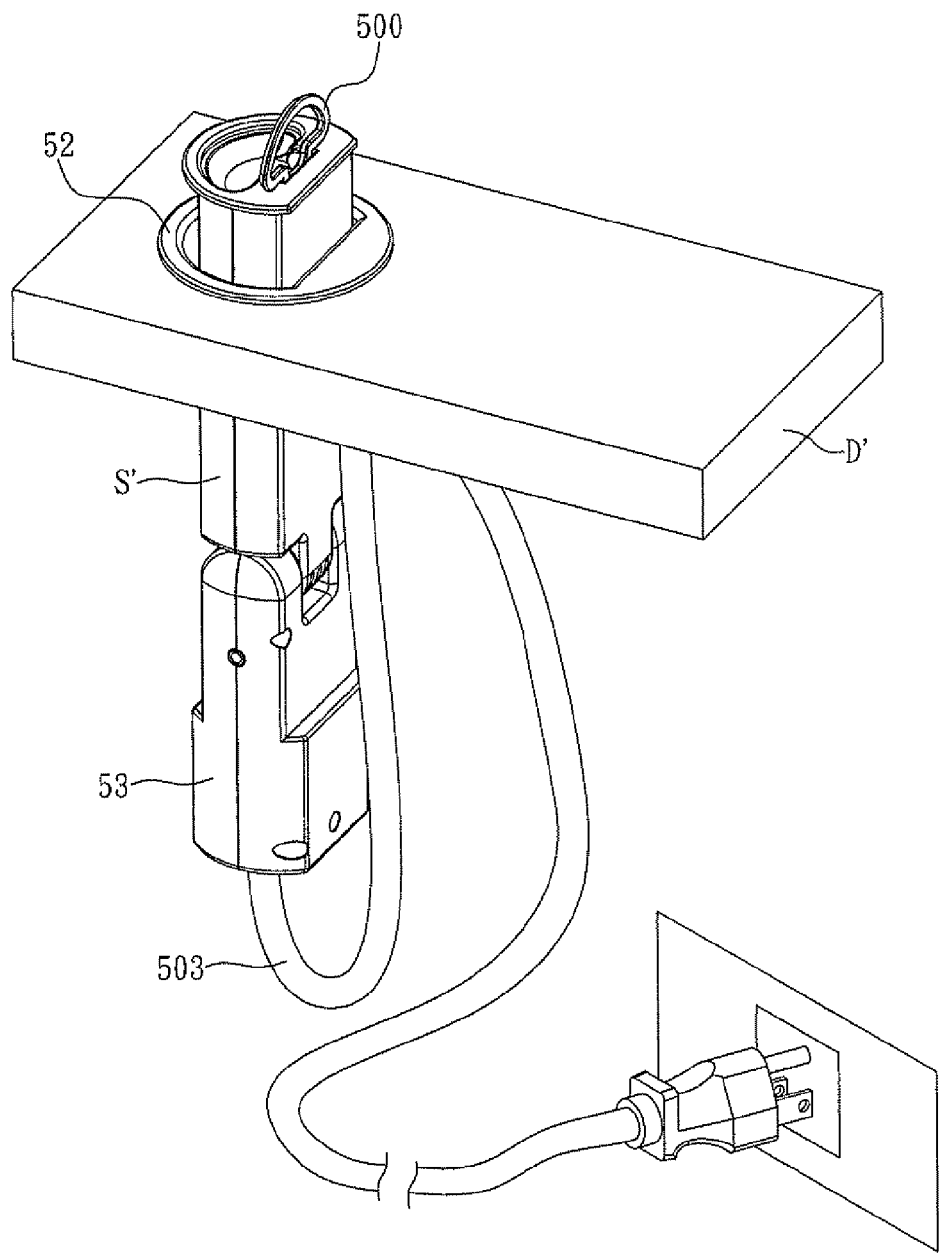
FIG. 9 is a perspective view showing the second preferred embodiment of the present invention in another state of use.
Figure 10:
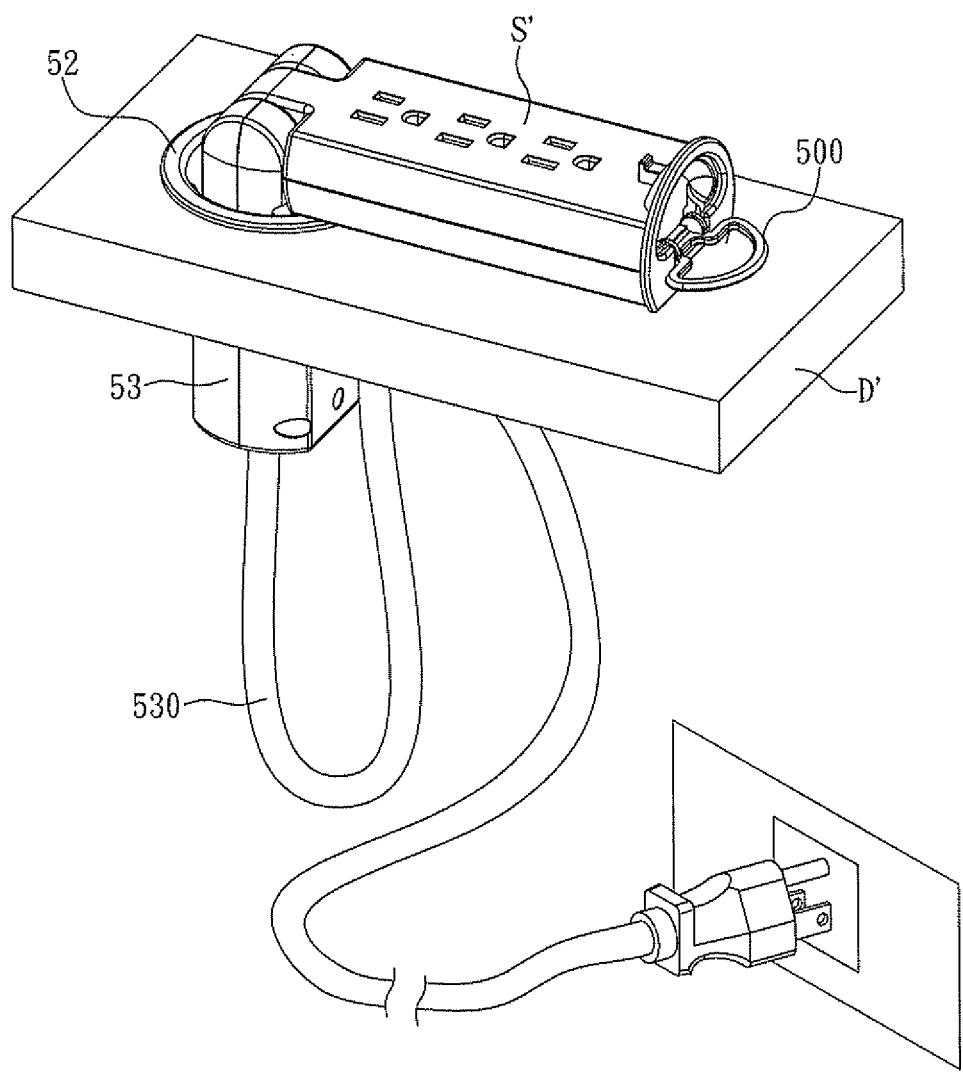
FIG. 10 is a perspective view showing the second preferred embodiment of the present invention in still another state of use.

Referring again to FIG. 6, the outer configuration of the power strip S' matches the upper opening 520 so as for the power strip S' to pass through the upper opening 520 and be received in the receiving space 522 of the positioning seat 52 and for the shoulder 501 of the power strip S' to rest on the rim of the upper opening 520. Thus, the power strip S' is supported by the positioning seat 52 and secured under the table D' (see FIG. 8) while the first engaging hook 502 is engaged with the second engaging hook 523 (see FIG. 7). Referring again to FIG. 6, the power strip hanging structure 5 further includes an extension element 53 which is pivotally connected to a second end (i.e., the bottom end in FIG. 6) of the power strip S'. As shown in FIG. 8, when it is desired to use the power strip S', the user only has to press the power strip S', and the resilient disengaging structure 524 (see FIG. 7) will eject the first engaging hook 502 from the second engaging hook 523 to pop up the power strip S'(see FIG. 9). As a result, the power strip S' is propelled upward by a predetermined distance. Then, referring to FIGS. 9 and 10, the user can draw the power strip S' out of the positioning seat 52 by pulling the puling portion 500 and lay the power strip S' fiat on the table D'. As the extension element 53 will be received in the positioning seat 52, the cord 530 connected to the extension element 53 is prevented from exerting a pulling force directly on the power strip S'. This allows the power strip S' to lie flat on the table D' without tilting upward at one end.

It should be understood that the foregoing embodiments are only some preferred embodiments of the present invention and are not restrictive of the technical features of the present invention. All variations or modifications easily conceivable by a person skilled in the art should be encompassed by the appended claims.

What is claimed is:

1. A power strip hanging device, comprising:
a hanging element having an end defining an end surface, the end surface being provided with a pulling portion to be pulled by a user, the end of the hanging element being peripherally provided with an outwardly extending shoulder, wherein the hanging element can be fixed at an end of a power strip so that both the hanging element and the power strip can be securely positioned in an installation hole of a table by way of the shoulder and wherein the hanging element comprises a hanger body on which the pulling portion and the shoulder are provided and a cover which can be connected with the hanger body to form the hanging element, the cover being provided with an insertion plug corresponding in configuration to and insertable into sockets of the power strip.

2. The power strip hanging device of claim 1, further comprising an insertion plug corresponding in configuration to and insertable into sockets of the power strip.

3. The power strip hanging device of claim 1, wherein the pulling portion is composed of at least a pulling groove.

4. The power strip hanging device of claim 1, wherein the pulling portion is a pulling ring pivotally connected to the end of the hanging element.

5. A power strip hanging device, comprising:
a hanging element having an end defining an end surface, the end surface being provided with a pulling portion to be pulled by a user, the end of the hanging element being peripherally provided with an outwardly extending shoulder, wherein the hanging element can be fixed at an end of a power strip so that both the hanging element and the power strip can be securely positioned in an installation hole of a table by way of the shoulder, and
further comprising a positioning seat, the positioning seat having a side provided with an upper opening and an opposite side provided with a lower opening in communication with the upper opening such that a receiving space is formed in the positioning seat, wherein the positioning seat is externally provided with an outwardly extending positioning portion configured for resting on the installation hole of the table and has an outer configuration matching the installation hole of the table so that the positioning seat can be securely positioned in the installation hole, the hanging element having an outer configuration matching the upper opening so that the hanging element can pass through the upper opening and be received in the receiving space while the shoulder rests on a rim of the upper opening, thereby allowing the positioning seat to support the hanging element, and the power strip connected with the hanging element and having passed through the positioning seat to be fixed under the table, and
wherein the hanging element is laterally provided with a first engaging hook, and the positioning seat is provided therein with a second engaging hook corresponding in position to the first engaging hook, the first engaging hook being engaged with the second engaging hook when the hanging element is positioned in the positioning seat.

6. The power strip hanging device of claim 5, wherein the positioning seat is externally provided with a fixing hook for pressing tightly against a hole wall of the installation hole such that the positioning seat is securely positioned in the installation hole.

7. A power strip hanging structure, comprising:
a power strip having an end defining an end surface, the end surface being provided with a pulling portion, the end of the power strip being peripherally provided with an outwardly extending shoulder so that the power strip can be securely positioned in an installation hole of a table by way of the shoulder and
further comprising a positioning seat, the positioning seat having a side provided with an upper opening and an opposite side provided with a lower opening in communication with the upper opening such that a receiving space is formed in the positioning seat, wherein the positioning seat is externally provided with an outwardly extending positioning portion configured for resting on the installation hole of the table and has an outer configuration matching the installation hole of the table so that the positioning seat can be securely positioned in the installation hole, the power strip having an outer configuration matching the upper opening so that the power strip can pass through the upper opening and be received in the receiving space while the shoulder rests on a rim of the upper opening, thereby allowing the positioning seat to support the power strip, and the power strip having passed through the positioning seat to be fixed under the table and
wherein the power strip is laterally provided with a first engaging hook, and the positioning seat is provided therein with a second engaging hook corresponding in position to the first engaging hook, the first engaging hook being engaged with the second engaging hook when the power strip is positioned in the positioning seat.

8. The power strip hanging structure of claim 7, wherein the pulling portion is composed of at least a pulling groove.

9. The power strip hanging structure of claim 7, wherein the pulling portion is a pulling ring pivotally connected to the end of the hanging element.

10. The power strip hanging structure of claim 7, wherein the positioning seat is externally provided with at least a fixing hook for pressing tightly against a hole wall of the installation hole such that the positioning seat is securely positioned in the installation hole.

11. A power strip hanging structure, comprising:
a power strip having an end defining an end surface, the end surface being provided with a pulling portion, the end of the power strip being peripherally provided with an outwardly extending shoulder so that the power strip can be securely positioned in an installation hole of a table by way of the shoulder and
comprising a positioning seat, the positioning seat having a side provided with an upper opening and an opposite side provided with a lower opening in communication with the upper opening such that a receiving space is formed in the positioning seat, wherein the positioning seat is externally provided with an outwardly extending positioning portion configured for resting on the installation hole of the table and has an outer configuration matching the installation hole of the table so that the positioning seat can be securely positioned in the installation hole, the power strip having an outer configuration matching the upper opening so that the power strip can pass through the upper opening and be received in the receiving space while the shoulder rests on a rim of the upper opening, thereby allowing the positioning seat to support the power strip, and the power strip having passed through the positioning seat to be fixed under the table and further comprising an extension element which is pivotally connected to a second end of the power strip.

* * * * *